United States Patent
Masuda et al.

(10) Patent No.: US 11,162,440 B2
(45) Date of Patent: Nov. 2, 2021

(54) VARIABLE COMPRESSION DEVICE AND ENGINE SYSTEM

(71) Applicant: IHI CORPORATION, Tokyo (JP)

(72) Inventors: Yutaka Masuda, Tokyo (JP); Yoshiyuki Umemoto, Aioi (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/013,409

(22) Filed: Sep. 4, 2020

(65) Prior Publication Data

US 2020/0400082 A1    Dec. 24, 2020

Related U.S. Application Data

(63) Continuation of application No. PCT/JP2019/012796, filed on Mar. 26, 2019.

(30) Foreign Application Priority Data

Apr. 6, 2018   (JP) .............................. JP2018-074126
Apr. 6, 2018   (JP) .............................. JP2018-074127

(51) Int. Cl.
  *F02D 15/02*    (2006.01)
  *F02B 75/32*    (2006.01)
  (Continued)

(52) U.S. Cl.
  CPC .............. *F02D 15/02* (2013.01); *F02B 75/32* (2013.01); *F02B 75/045* (2013.01); *F02D 15/04* (2013.01);
  (Continued)

(58) Field of Classification Search
  CPC ........ F02D 15/02; F02D 15/04; F02D 41/001; F02D 2700/03; F02D 15/00; F02B 75/32;
  (Continued)

(56) References Cited

U.S. PATENT DOCUMENTS

| | | |
|---|---|---|
| 4,938,192 A | 7/1990 | Pusic |
| 2011/0283963 A1 | 11/2011 | Yan |
| 2016/0319739 A1* | 11/2016 | Yamada ................ F02B 75/045 |

FOREIGN PATENT DOCUMENTS

| | | |
|---|---|---|
| DE | 102016208209 A1 | 11/2017 |
| EP | 2687707 A2 | 1/2014 |

(Continued)

OTHER PUBLICATIONS

International Search Report issued in Application No. PCT/JP2019/012796, dated Jun. 18, 2019, 4 pages.

*Primary Examiner* — Jacob M Amick
(74) *Attorney, Agent, or Firm* — Rothwell, Figg, Ernst & Manbeck, P.C.

(57) ABSTRACT

A variable compression device includes a piston rod, a first fluid chamber configured to move the piston rod in a direction in which a compression ratio is increased by supplying a pressurized working fluid thereto, a regulation member configured to regulate movement of the piston rod in a direction in which a compression ratio is increased, a second fluid chamber provided between the piston rod and the regulation member and configured to store the working fluid, a supply flow path configured to guide the working fluid supplied to the second fluid chamber, a discharge flow path configured to guide the working fluid discharged from the second fluid chamber, and a flow rate regulation unit provided in the discharge flow path and configured to regulate a flow of the working fluid when the piston rod approaches the regulation member.

9 Claims, 5 Drawing Sheets

(51) Int. Cl.
*F02B 75/04* (2006.01)
*F02D 15/04* (2006.01)
*F02D 41/00* (2006.01)

(52) U.S. Cl.
CPC .... *F02D 2041/001* (2013.01); *F02D 2700/03* (2013.01)

(58) Field of Classification Search
CPC ...... F02B 75/045; F02B 75/04; F02B 75/044; F02B 75/048; F16N 7/38; F16N 13/16
See application file for complete search history.

(56) References Cited

FOREIGN PATENT DOCUMENTS

| | | |
|---|---|---|
| EP | 3098416 A1 | 11/2016 |
| EP | 3098417 A1 | 11/2016 |
| EP | 3296539 A1 | 3/2018 |
| EP | 3296597 A1 | 3/2018 |
| JP | 10502986 | 3/1998 |
| JP | 2014-020375 A | 2/2014 |
| WO | 96/01943 A1 | 1/1996 |
| WO | 2015108182 A1 | 7/2015 |
| WO | 2018083263 A1 | 5/2018 |

\* cited by examiner

VARIABLE COMPRESSION DEVICE AND ENGINE SYSTEM

CROSS-REFERENCE TO RELATED APPLICATIONS

This application is a Continuation Application based on International Application No. PCT/JP2019/012796, filed on Mar. 26, 2019, which claims priority on Japanese Patent Application No. 2018-074126, filed on Apr. 6, 2018, and Japanese Patent Application No. 2018-074127, filed on Apr. 6, 2018, the contents of which are incorporated herein by reference.

TECHNICAL FIELD

The present disclosure relates to a variable compression device and an engine system.

BACKGROUND

For example, Patent Document 1 discloses a large reciprocating piston combustion engine including a crosshead. The large reciprocating piston combustion engine disclosed in Patent Document 1 is a dual fuel engine that can be operated using both a liquid fuel such as heavy oil and a gaseous fuel such as natural gas. In the large reciprocating piston combustion engine disclosed in Patent Document 1, in order to cope with both a compression ratio suitable for operation using the liquid fuel and a compression ratio suitable for operation using the gaseous fuel, an adjustment mechanism (variable compression device) that changes a compression ratio by moving a piston rod using hydraulic pressure is provided in a crosshead portion.

DOCUMENT OF RELATED ART

Patent Document

[Patent Document 1] Japanese Unexamined Patent Application, First Publication No. 2014-20375

SUMMARY

A variable compression device having such a configuration includes a regulation member that regulates movement of a piston rod in a direction in which a compression ratio is increased. Here, in a state where combustion pressure is not applied such as a case where an engine is started or a case where an engine is suddenly stopped, a downward force for pushing down a piston due to pressure inside a cylinder becomes smaller than an upward inertial force caused by the reciprocation of the piston rod, and thus the piston rod rises due to its own inertial force regardless of an oil pressure of a lower oil chamber. When the piston rod is moved in a direction of coming closer to the regulation member (a direction in which a compression ratio is increased) due to the inertial force, the regulation member and the piston rod collide with each other.

Further, in a case of operation at a high compression ratio, the piston abuts the regulation member. However, when the piston rod is moved in a state where combustion pressure is not generated inside a combustion chamber such as a case where an engine is started, the piston rod may collide with the regulation member, which leads to a possibility that a large force may be applied to the regulation member.

The disclosure has been made in view of the above-described problems, and an object thereof is to prevent a regulation member and a piston rod from colliding with each other in a variable compression device.

In addition, the disclosure has been made in view of the above-described problems, and an object thereof is to minimize collision energy which is applied to a regulation member from a piston rod.

A variable compression device according to an aspect of the disclosure is configured to change a compression ratio in a combustion chamber of an engine and includes a piston rod, a first fluid chamber which is configured to move the piston rod in a direction in which a compression ratio is increased by supplying a pressurized working fluid thereto, a regulation member which is configured to regulate movement of the piston rod in a direction in which a compression ratio is increased, a second fluid chamber which is provided between the piston rod and the regulation member and is configured to store the working fluid, a supply flow path which is configured to guide the working fluid supplied to the second fluid chamber, a discharge flow path which is configured to guide the working fluid discharged from the second fluid chamber, and a flow rate regulation unit which is provided in the discharge flow path and is configured to regulate a flow of the working fluid when the piston rod approaches the regulation member.

In the variable compression device according to the aspect, the flow rate regulation unit may include a weight member which is movable together with the piston rod, and a valve which is moved in a valve closing direction by movement of the weight member.

In the variable compression device according to the aspect, the flow rate regulation unit may include a biasing member that is configured to bias the weight member in a valve opening direction.

In the variable compression device according to the aspect, a portion of the working fluid supplied to the first fluid chamber may be supplied to the second fluid chamber.

The variable compression device according to the aspect may further include a fluid chamber forming member which forms a portion of the first fluid chamber, and an absorption member which is fixed to the regulation member or the piston rod, and is configured to absorb collision energy between the regulation member and the piston rod by elastic deformation.

The variable compression device according to the aspect may further include a fixing member which is configured to fix the regulation member to the fluid chamber forming member, the fixing member may include a shaft portion which is inserted into the regulation member and the fluid chamber forming member, and a head portion which is fixed to the shaft portion and is disposed separately from the regulation member, and the absorption member may be provided between the regulation member and the head portion.

In the variable compression device according to the aspect, the absorption member may be provided between the regulation member and the piston rod.

In the variable compression device according to the aspect, the regulation member may include a concave portion to which the absorption member is fitted.

An engine system according to an aspect of the disclosure includes the variable compression device.

According to the disclosure, when a piston rod is moved in a direction of coming closer to a regulation member, a flow rate regulation unit closes a discharge flow path, and thus it is possible to maintain a state where hydraulic oil is stored in a second fluid chamber. A working fluid in the second fluid chamber operates as a damper, so that it is possible to prevent the piston rod from colliding with the regulation member with a large force.

In addition, according to the disclosure, an absorption member is elastically deformed, so that it is possible to absorb collision energy generated when the piston rod collides with the regulation member. Therefore, it is possible to reduce collision energy received by the regulation member from the piston rod and to reduce an impact to be applied to the regulation member.

DESCRIPTION OF EMBODIMENTS

First Embodiment

Hereinafter, an engine system according to a first embodiment of the disclosure will be described with reference to FIGS. 1 to 3.

An engine system 100 of the present embodiment is mounted in a ship such as a large tanker. As shown in FIG. 1, the engine system 100 includes an engine 1, a supercharger 200, and a controller 300. Meanwhile, in present embodiment, description will be given by regarding the supercharger 200 as an auxiliary device and providing the supercharger 200 as a separate body from the engine 1 (main device). However, the supercharger 200 may be configured as a part of the engine 1.

The engine 1 is a multi-cylinder uniflow scavenging diesel engine. The engine 1 has a gas operation mode in which a gaseous fuel such as natural gas is burned together with a liquid fuel such as heavy oil, and a diesel operation mode in which a liquid fuel such as heavy oil is burned. Meanwhile, in the gas operation mode, only a gaseous fuel may be burned. The engine 1 includes a frame 2, a cylinder portion 3, a piston 4, an exhaust valve unit 5, a piston rod 6, a crosshead 7, a hydraulic portion 8 (boosting mechanism), a connecting rod 9, a crank angle sensor 10, a crank shaft 11, a scavenging reservoir 12, an exhaust reservoir 13, an air cooler 14, and an upper hydraulic chamber hydraulic mechanism 15. In addition, a cylinder is constituted by the cylinder portion 3, the piston 4, the exhaust valve unit 5, and the piston rod 6.

The frame 2 is a strength member that supports the entire engine 1, and accommodates the crosshead 7, the hydraulic portion 8, and the connecting rod 9 therein. In addition, a crosshead pin 7a to be described later of the crosshead 7 can be reciprocated inside the frame 2.

The cylinder portion 3 includes a cylindrical cylinder liner 3a, a cylinder head 3b, and a cylinder jacket 3c. The cylinder liner 3a is a cylindrical member. A sliding surface with respect to the piston 4 is formed on the inner side (inner circumferential surface) of the cylinder liner 3a. A space surrounded by the inner circumferential surface of the cylinder liner 3a and the piston 4 serves as a combustion chamber R1. In addition, a plurality of scavenging ports S are formed in a lower portion of the cylinder liner 3a. The scavenging ports S are openings which are arranged along the circumferential surface of the cylinder liner 3a and make a scavenging chamber R2 inside the cylinder jacket 3c and the inner side of the cylinder liner 3a communicate with each other. The cylinder head 3b is a lid member provided in an upper end portion of the cylinder liner 3a. An exhaust port H is formed in the central portion of the cylinder head 3b when seen in a plan view. The exhaust port H is connected to the exhaust reservoir 13. In addition, a fuel injection valve (not shown) is provided in the cylinder head 3b. Further, a cylinder internal pressure sensor (not shoe provided in the vicinity of the fuel injection valve of the cylinder head 3b. The cylinder internal pressure sensor detects a pressure in the combustion chamber R1 and transmits the detected pressure to the controller 300. The cylinder jacket 3c is a cylindrical or box-shaped member which is provided between the frame 2 and the cylinder liner 3a and into which a lower end portion of the cylinder liner 3a is inserted. The scavenging chamber R2 is formed inside the cylinder jacket 3c. In addition, the scavenging chamber R2 of the cylinder jacket 3c is connected to the scavenging reservoir 12.

The piston 4 having a substantially columnar shape is connected to the piston rod 6 to be described later and is disposed on the inner side of the cylinder liner 3a. In addition, a piston ring (not shown) is provided on the outer circumferential surface of the piston 4, and a gap between the piston 4 and the cylinder liner 3a is sealed by the piston ring. The piston 4 slides inside the cylinder liner 3a together with the piston rod 6 due to a fluctuation in pressure in the combustion chamber R1.

The exhaust valve unit 5 includes an exhaust valve 5a, an exhaust valve casing 5b, and an exhaust valve driving unit (not shown). The exhaust valve 5a is provided on the inner side of the cylinder head 3b and closes the exhaust port H in the cylinder portion 3 by the exhaust valve driving unit. The exhaust valve casing 5b is a cylindrical housing that accommodates an end portion of the exhaust valve 5a. The exhaust valve driving unit is an actuator that moves the exhaust valve 5a in a direction parallel to a stroke direction of the piston 4.

The piston rod 6 is an elongate member having one end connected to the piston 4 and the other end coupled to the crosshead pin 7a. An end portion of the piston rod 6 is inserted into the crosshead pin 7a, and the connecting rod 9 is rotatably coupled to the crosshead pin 7a. A portion of the end portion of the piston rod 6 on the crosshead pin 7a side has a large diameter portion formed to have a large diameter.

The crosshead 7 includes the crosshead pin 7a, a guide shoe 7b, and a lid member 7c (regulation member). The crosshead pin 7a is a columnar shape member that movably couples the piston rod 6 and the connecting rod 9 to each other. A hydraulic chamber R3 (fluid chamber, first fluid chamber) to and from which hydraulic oil (working fluid) is supplied and discharged is formed in an insertion space of the crosshead pin 7a where the end portion of the piston rod 6 is inserted. An outlet hole O penetrating the crosshead pin 7a in the axial direction of the crosshead pin 7a is formed on a side lower than the center of the crosshead pin 7a. The outlet hole O is an opening through which cooling oil having passed through a cooling flow passage (not shown) of the piston rod 6 is discharged. In addition, the crosshead pin 7a is provided with a supply flow passage R4 that connects the hydraulic chamber R3 and a plunger pump 8c to be described later to each other, and a relief flow passage R5 that connects the hydraulic chamber R3 and a relief valve 8f to be described later to each other.

The guide shoe 7b rotatably supports the crosshead pin 7a. The guide shoe 7b moves, on a guide rail (not shown), in the stroke direction of the piston 4 in association with the crosshead pin 7a. The guide shoe 7b moves along the guide rail, so that the crosshead pin 7a is regulated with respect to a rotational motion and to movement other than movement in a linear direction parallel to the stroke direction of the piston 4. The lid member 7c is an annular member which is fixed to an upper portion of the crosshead pin 7a and into which the end portion of the piston rod 6 is inserted. In addition, a seal ring is provided on a sliding surface of the lid member 7c with respect to the piston rod 6. Thereby, an upper hydraulic chamber R6 (regulation member-side fluid chamber, second fluid chamber) is formed between the lid member 7c and the large diameter portion of the piston rod 6. In addition, a portion of a supply flow path R7 for guiding hydraulic oil supplied to the upper hydraulic chamber R6 and a portion of a discharge flow path R8 for guiding hydraulic oil discharged from the upper hydraulic chamber R6 are formed in the lid member 7c. The crosshead 7 transmits a linear motion of the piston 4 to the connecting rod 9.

Figure 2:
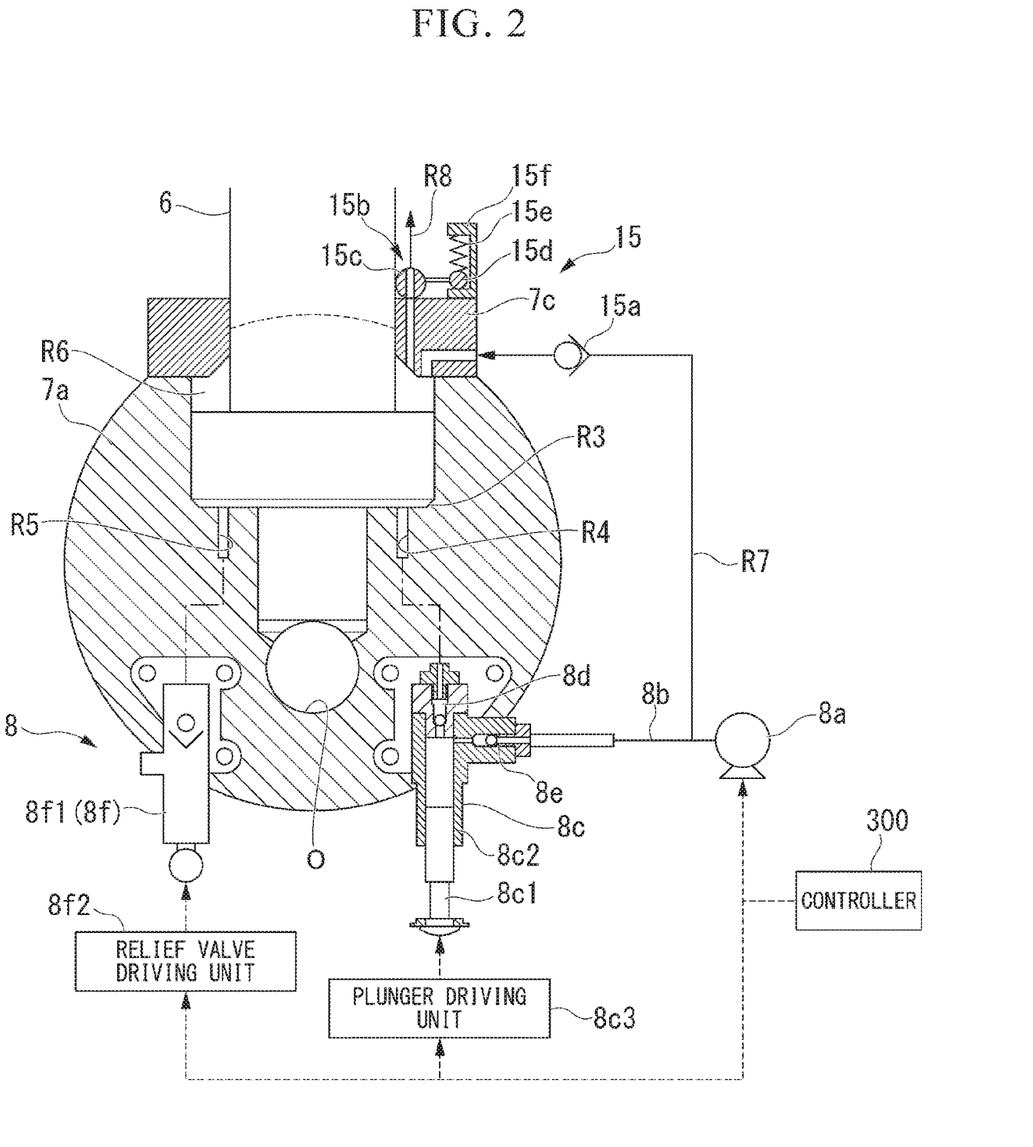
FIG. 2 is a schematic cross-sectional view showing a portion of the engine system according to the first embodiment of the disclosure.
Figure 3:
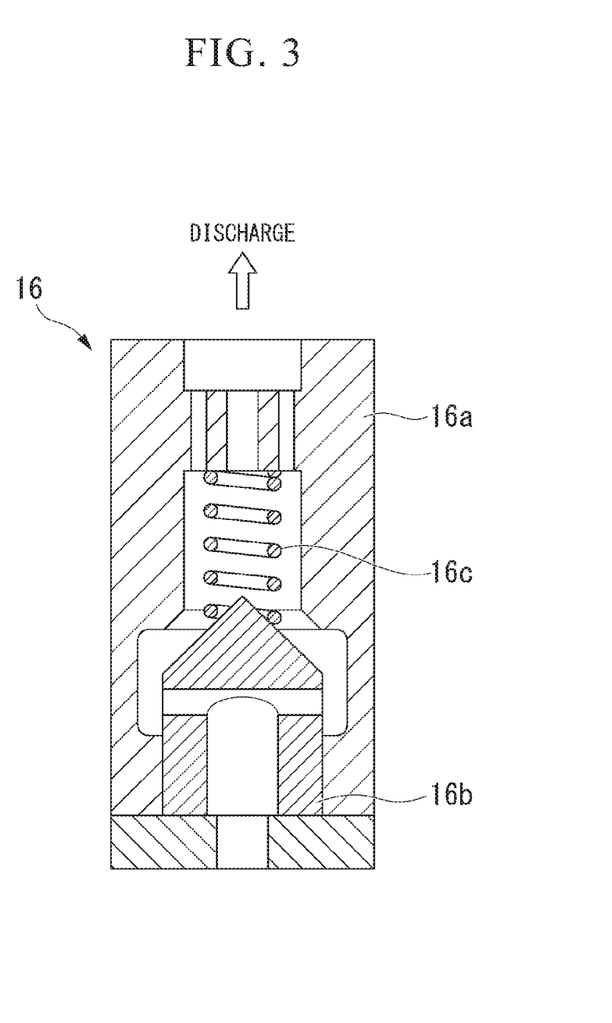
FIG. 3 is a cross-sectional view showing a modification example of a flow rate regulation unit included in the engine system according to the first embodiment of the disclosure.

As shown in FIG. 2, the hydraulic portion 8 includes a supply pump 8a, an oscillating pipe 8b, the plunger pump 8c, a first check valve 8d and a second check valve 8e included in the plunger pump 8c, and the relief valve 8f. In addition, the piston rod 6, the crosshead 7, the hydraulic portion 8, the upper hydraulic chamber hydraulic mechanism 15, and the controller 300 function as a variable compression device in the present embodiment.

The supply pump 8a pressurizes hydraulic oil supplied from a hydraulic oil tank (not shown) and supplies the pressurized hydraulic oil to the plunger pump 8c on the basis of an instruction received from the controller 300. The supply pump 8a is driven using power of a generator of the ship and can be operated before a liquid fuel is supplied to the combustion chamber R1. The oscillating pipe 8b connects the supply pump 8a and the plunger pump 8c of each cylinder to each other. The oscillating pipe 8b is slidable between the plunger pump 8c moving in association with the crosshead pin 7a and the fixed supply pump 8a.

The plunger pump 8c is fixed to the crosshead pin 7a. The plunger pump 8c includes a rod-shaped plunger 8c1, a tubular cylinder 8c2 that slidably accommodates the plunger 8c1, and a plunger driving unit 8c3. In the plunger pump 8c, the plunger 8c1 slides inside the cylinder 8c2 by a driving unit (not shown) connected to the plunger 8c1, thereby pressurizing hydraulic oil and supplying the pressurized hydraulic oil to the hydraulic chamber R3. In addition, the first check valve 8d is provided in an opening, on an ejection side of hydraulic oil, which is provided in an end portion of the cylinder 8c2, and the second check valve 8e is provided in an opening, on an injection side of hydraulic oil, which is provided on the side circumferential surface of the cylinder 8c2. The plunger driving unit 8c3 is connected to the plunger 8c1 and reciprocates the plunger 8c1 on the basis of an instruction received from the controller 300.

The first check valve 8d is configured to be closed by a valve body being biased toward the inner side of the cylinder 8c2 and prevents hydraulic oil supplied to the hydraulic chamber R3 from flowing backward to the cylinder 8c2. In addition, the first check valve 8d is opened by the valve body being pressed by hydraulic oil when the pressure of the hydraulic oil in the cylinder 8c2 becomes equal to or higher than a biasing force (valve-opening pressure) of a biasing member of the first check valve 8d. The second check valve 8e is biased toward the outer side of the cylinder 8c2 and prevents the hydraulic oil supplied to the cylinder 8c2 from flowing backward to the supply pump 8a. In addition, the second check valve 8e is opened by the valve body being pressed by hydraulic oil when the pressure of the hydraulic oil supplied from the supply pump 8a becomes equal to or higher than a biasing force (valve-opening pressure) of a biasing member of the second check valve 8e. Meanwhile, the valve-opening pressure of the first check valve 8d is higher than the valve-opening pressure of the second check valve 8e, and the first check valve 8d is not opened by the pressure of hydraulic oil supplied from the supply pump 8a in a normal operation state where the system is operated at a preset compression ratio.

The relief valve 8f is provided in the crosshead pin 7a. The relief valve 8f includes a main body 8f1 and a relief valve driving unit 8f2. The main body 8f1 is a valve which is connected to the hydraulic chamber R3 and the hydraulic oil tank (not shown). The relief valve driving unit 8f2 is connected to a valve body of the main body 8f1 and opens and closes the main body 8f1 on the basis of an instruction received from the controller 300. The relief valve 8f is opened by the relief valve driving unit 8f2, so that hydraulic oil stored in the hydraulic chamber R3 is returned to the hydraulic oil tank.

Figure 1:
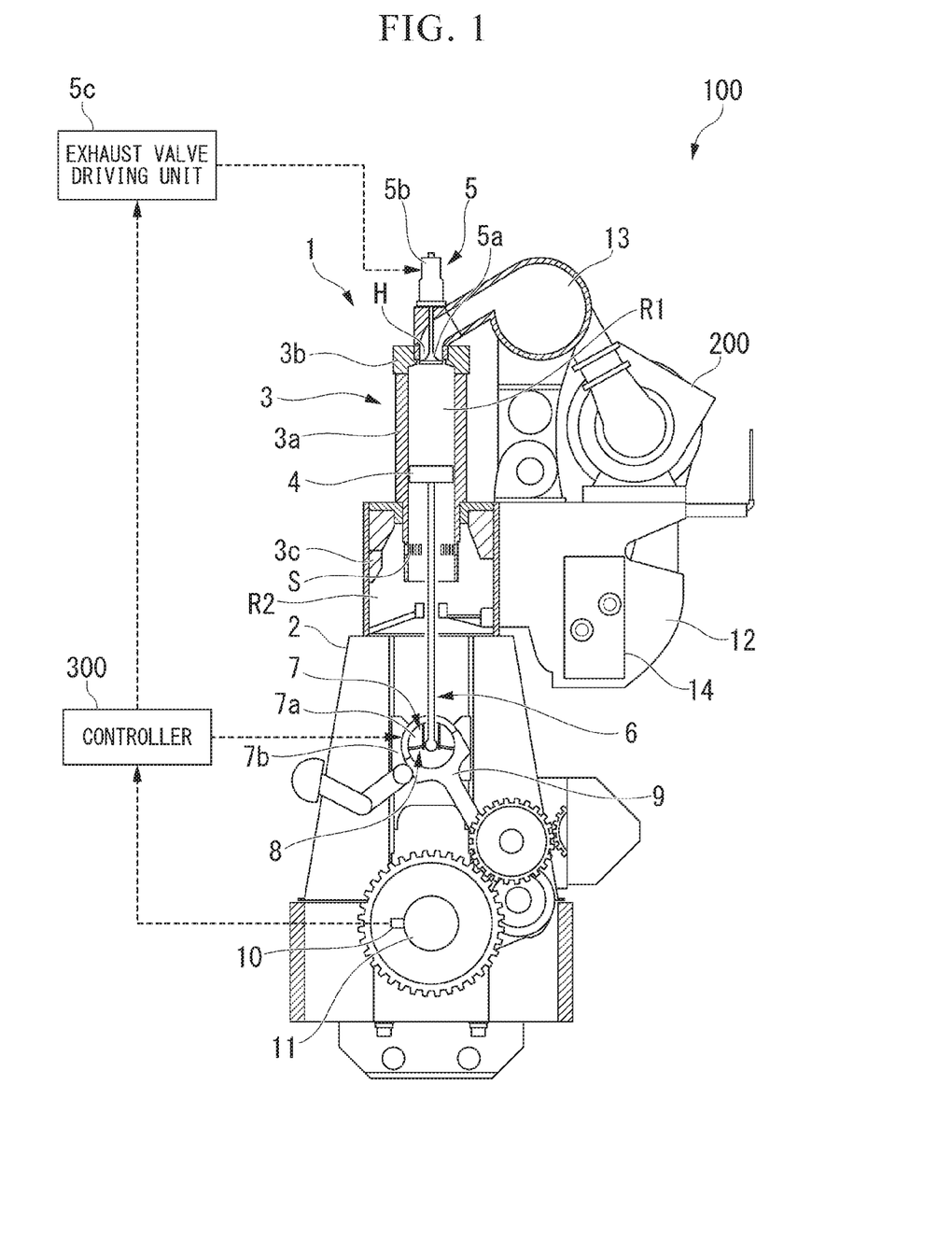
FIG. 1 is a cross-sectional view of an engine system according to a first embodiment of the disclosure.

As shown in FIG. 1, the connecting rod 9 is an elongate member which is coupled to the crosshead pin 7a and coupled to the crank shaft 11. The crosshead pin 7a is rotatably connected to an end of the connecting rod 9, and the connecting rod 9 converts a linear motion of the piston 4 which is transmitted to the crosshead pin 7a into a rotational motion. The crank angle sensor 10 is a sensor for measuring a crank angle of the crank shaft 11, and transmits a crank pulse signal for calculating a crank angle to the controller 300.

The crank shaft 11, which is an elongate member which is connected to the connecting rod 9 provided in the cylinder, is rotated by rotational motions transmitted to the respective connecting rods 9 to transmit power to, for example, a screw or the like. The scavenging reservoir 12 is provided between the cylinder jacket 3c and the supercharger 200, and air pressurized by the supercharger 200 flows into the scavenging reservoir 12. In addition, the air cooler 14 is provided inside the scavenging reservoir 12. The exhaust reservoir 13 is a tubular member which is connected to the exhaust port H of each cylinder and connected to the supercharger 200. A gas discharged from the exhaust port H is temporarily stored in the exhaust reservoir 13 and is then supplied to the supercharger 200 in a state where pulsation is suppressed. The air cooler 14 cools air inside the scavenging reservoir 12.

The upper hydraulic chamber hydraulic mechanism 15 includes a check valve 15a and a throttle valve device 15b (flow rate regulation unit). The check valve 15a is provided in the supply flow path R7, and prevents hydraulic oil in the upper hydraulic chamber R6 from flowing backward to the supply pump 8a side. The throttle valve device 15b includes a flow path member 15c, a weight member 15d, a biasing spring 15e (biasing member), and a supporting member 15f.

The flow path member 15c is a columnar member which is rotatably fixed to the lid member 7c using a bearing member (not shown) or the like. The flow path member 15c forms a portion of the discharge flow path R8 in a value open state, and regulates a flow in the discharge flow path R8 by being rotated. The weight member 15d is supported from below by the supporting member 15f fixed to the lid member 7c and is supported by the biasing spring 15e fixed to the piston rod 6 in a state where the weight member 15d is suspended.

The weight member 15d is connected to the flow path member 15c and is moved in a vertical direction due to an inertial force. That is, the weight member 15d is moved upward in the vertical direction when an inertial force directed vertically upward is applied due to the lid member 7c moving upward in the vertical direction in association with the crosshead pin 7a. An upper end of the biasing spring 15e in the vertical direction is fixed to the supporting member 15f. The weight member 15d is suspended from the biasing spring 15e. The supporting member 15f is fixed to the lid member 7c and moves up and down together with the lid member 7c. The supporting member 15f supports the weight member 15d and the biasing spring 15e.

The supercharger 200 pressurizes air suctioned from an intake port (not shown) and supplies the pressurized air to the combustion chamber R1 by a turbine which is rotated by a gas discharged from the exhaust port H.

The controller 300 is a computer that controls the amount of fuel to be supplied, and the like on the basis of an operation of an operator of the ship, or the like. The controller 300 includes a reception unit that receives wireless communication of a communication unit of a position detection unit (not shown). In addition, the controller 300 changes a compression ratio in the combustion chamber R1 by controlling the hydraulic portion 8. Specifically, the controller 300 acquires positional information of the piston rod 6 on the basis of a signal received from the position detection unit, and controls the plunger pump 8c, the supply pump 8a, and the relief valve 8f to adjust the amount of hydraulic oil in the hydraulic chamber R3, thereby changing the position of the piston rod 6 to change a compression ratio.

The engine system 100 causes the piston 4 to slide within the cylinder liner 3a to rotate the crank shaft 11 by igniting and exploding fuel injected into the combustion chamber R1 from the fuel injection valve (not shown). In detail, the fuel supplied to the combustion chamber R1 is mixed with air flowing from the scavenging ports S and is then compressed due to the movement of the piston 4 in the direction of the top dead center, which results in a rise in temperature and spontaneous ignition. Further, in the case of a liquid fuel, the liquid fuel is vaporized due to a rise in temperature in the combustion chamber R1 and is spontaneously ignited.

In addition, the fuel in the combustion chamber R1 is rapidly expanded by spontaneous ignition, and a pressure directed in a direction of a bottom dead center is applied to the piston 4. Thereby, the piston 4 moves in the direction of the bottom dead center, the piston rod 6 is moved in association with the piston 4, and the crank shaft 11 is rotated via the connecting rod 9. Further, the piston 4 is moved to the bottom dead center, so that pressurized air flows into the combustion chamber R1 from the scavenging ports S. The exhaust port H is opened due to the exhaust valve unit 5 being driven, and an exhaust gas in the combustion chamber R1 is pushed out to the exhaust reservoir 13 by pressurized air.

In a case where a compression ratio is increased, the controller 300 drives the supply pump 8a to supply hydraulic oil to the plunger pump 8c. In addition, the controller 300 drives the plunger pump 8c to pressurize hydraulic oil to a pressure capable of lifting the piston rod 6, and supplies the pressurized hydraulic oil to the hydraulic chamber R3. The end portion of the piston rod 6 is lifted by the pressure of the hydraulic oil in the hydraulic chamber R3, and accordingly, the position of the top dead center of the piston 4 is moved upward (to the exhaust port H side).

In a case where a compression ratio is decreased, the controller 300 drives the relief valve 8f to make the hydraulic chamber R3 and the hydraulic oil tank (not shown) communicate with each other. The load of the piston rod 6 is applied to the hydraulic oil in the hydraulic chamber R3, and the hydraulic oil in the hydraulic chamber R3 is pushed out to the hydraulic oil tank through the relief valve 8f. Thereby, the hydraulic oil of the hydraulic chamber R3 is reduced, and the piston rod 6 is moved downward (to the crank shaft 11 side), thereby moving the position of the top dead center of the piston 4 downward.

In addition, a portion of hydraulic oil flows into the upper hydraulic chamber R6 through the supply flow path R7 from the supply pump 8a, and the upper hydraulic chamber R6 is filled with hydraulic oil. In a case where a force directed vertically downward is applied to the piston rod 6, the throttle valve device 15b provided in the discharge flow path R8 is in a valve open state at all times, and hydraulic oil overflowing from the upper hydraulic chamber R6 is discharged to the outside through the discharge flow path R8. Meanwhile, the pressure of hydraulic oil supplied front the supply pump 8a is lower than the pressure of hydraulic oil supplied through the plunger pump 8c. Therefore, the pressure of hydraulic oil in the upper hydraulic chamber R6 is set to be lower than the pressure of hydraulic oil in the hydraulic chamber R3.

The crankshaft 11 is rotated through the connecting rod 9 in association with the vertical movement of the crosshead pin 7a. The piston 4 and the piston rod 6 are not fixed to the crosshead pin 7a in the vertical direction, and thus an inertial force is applied to the piston 4 and the piston rod 6 due to the movement of the crosshead pin 7a. When the engine 1 is suddenly stopped using crash astern or the like and when the engine 1 is started, combustion pressure is not applied to the piston 4, and thus a downward force for pushing down the piston 4 due to pressure inside the cylinder is reduced. When an inertial force directed vertically upward, which is larger than the downward force for pushing down the piston 4 due to pressure inside the cylinder, is applied to the piston rod 6, the piston rod 6 is moved in a direction coming close to the lid member 7c. In this case, an inertial force directed vertically upward and an elastic force of the biasing spring 15e are applied to the weight member 15d which is movably supported by the biasing spring 15e, and the weight member 15d is raised upward in the vertical direction, so that the flow path member 15c is rotated. The discharge flow path R8 is closed due to the rotation of the flow path member 15c, so that hydraulic oil in the upper hydraulic chamber R6 is not discharged from the upper hydraulic chamber R6. Therefore, even when the piston rod 6 is raised upward in the vertical direction due to the inertial force, hydraulic oil in the upper hydraulic chamber R6 works as a damper, so that it is possible to prevent the piston rod 6 from colliding with the lid member 7c with a large force.

When the piston rod 6 starts to move downward in the vertical direction (a direction away from the lid member 7c) due to reaction or the like, the weight member 15d is moved downward in the vertical direction due to its own weight, the flow path member 15c is rotated, and the discharge flow path R8 is opened.

In addition, when the rotational speed of the engine 1 changes, an inertial force is applied to the weight member 15*d*, and thus the weight member 15*d* is slightly raised upward in the vertical direction. Thereby, the flow path member 15*c* is slightly rotated, and an inlet and an outlet of the flow path member 15*c* are narrowed, so that the flow rate of the discharge flow path R8 can be reduced.

According to the present embodiment, when the piston rod 6 is moved in a direction coming close to the lid member 7*c*, the throttle valve device 15*b* is operated, so that it is possible to maintain a state where hydraulic oil is stored in the upper hydraulic chamber R6. Hydraulic oil stored in the upper hydraulic chamber R6 works as a damper, so that it is possible to prevent the piston rod 6 from colliding with the lid member 7*c* with a large force.

In addition, according to the present embodiment, the throttle valve device 15*b* switches between opening and closing of the discharge flow path R8 by rotation of the flow path member 15*c* using the weight member 15*d* moving together with the piston rod 6. Thereby, it is possible to mechanically open and close the throttle valve device 15*b* and prevent the piston rod 6 from colliding with the lid member 7*c* with a large force without performing complex sensing or the like.

In addition, according to the present embodiment, the weight member 15*d* is biased upward in the vertical direction (valve opening direction) by the biasing spring 15*e*. Thereby, after the throttle valve device 15*b* is once closed, the throttle valve device 15*b* can be smoothly opened by rotating the flow path member 15*c* with the movement of the piston rod 6.

In addition, according to the present embodiment, a portion of hydraulic oil supplied to the hydraulic chamber R3 is supplied to the upper hydraulic chamber R6 through the supply flow path R7. Thereby, it is not necessary to provide a new hydraulic system for providing the upper hydraulic chamber R6, and a configuration can be simplified.

Second Embodiment

Subsequently, an engine system according to a second embodiment of the disclosure will be described with reference to FIG. 4. Meanwhile, components in common with those in the first embodiment will be denoted by the same reference numerals and signs, and a description thereof will be omitted.

In an engine system 100 of the present embodiment, the upper hydraulic chamber hydraulic mechanism 15, the supply flow path R7, and the discharge flow path R8 are not provided. In the engine system 100 of the present embodiment, a crosshead 107 is provided with a fixing bolt 107*d* and a coil spring 107*e*.

Figure 4:
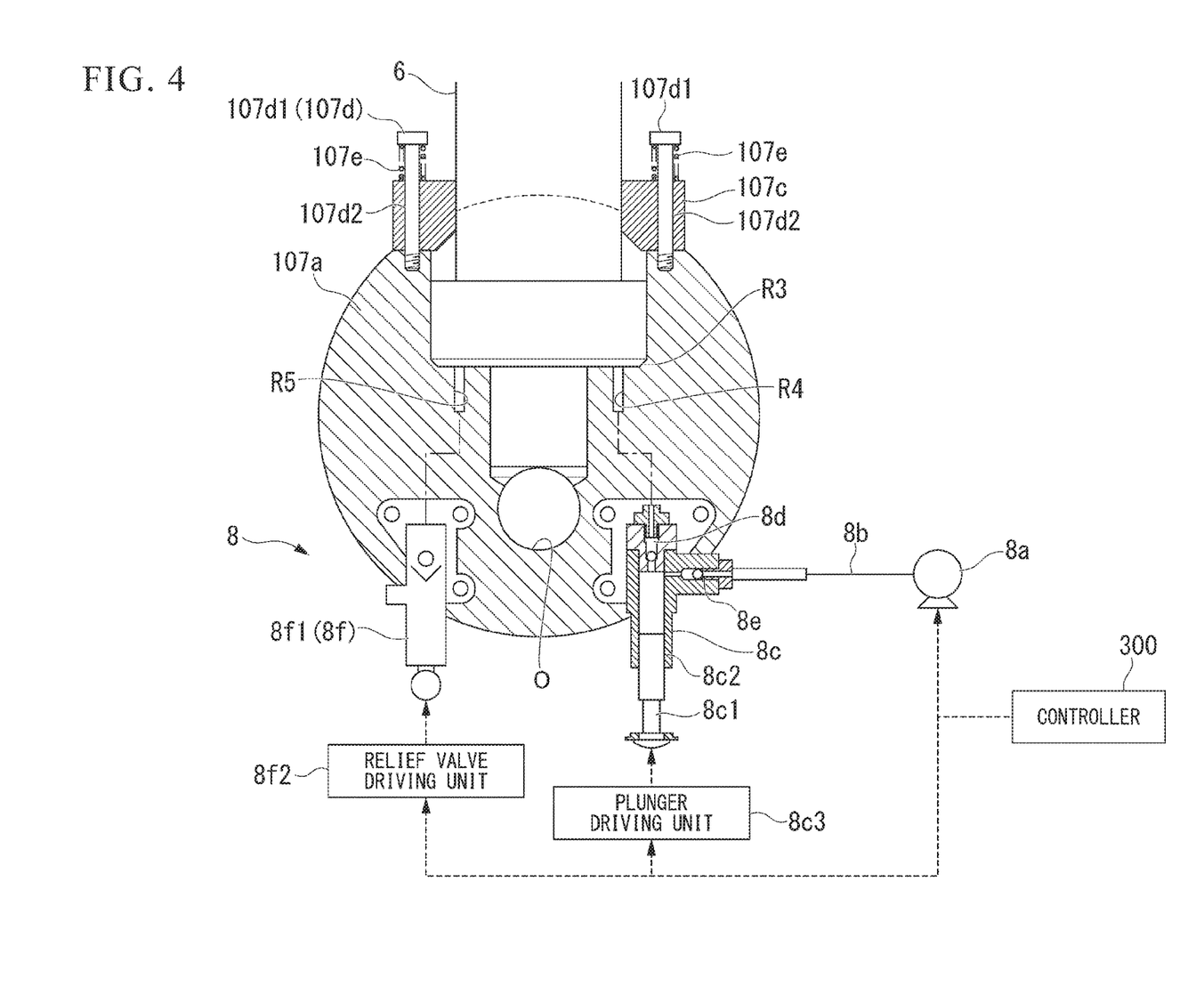
FIG. 4 is a schematic cross-sectional view showing a portion of an engine system according to a second embodiment of the disclosure.

As shown in FIG. 4, the crosshead 107 includes a crosshead pin 107*a* (fluid chamber forming member), the guide shoe 7*b*, a lid member 107*c* (regulation member), a plurality of fixing bolts 107*d* (fixing member), and the coil springs 107*e* (absorption member). The crosshead pin 107*a* is a columnar shape member that movably couples the piston rod 6 and the connecting rod 9 to each other. A hydraulic chamber R3 (fluid chamber, first fluid chamber) to and from which hydraulic oil (working fluid) is supplied and discharged is formed by an insertion space of the crosshead pin 107*a* where the end portion of the piston rod 6 is inserted and a flange (large diameter portion) of the piston rod 6. Art outlet hole O penetrating the crosshead pin 107*a* in the axial direction of the crosshead pin 107*a* is formed on a side lower than the center of the crosshead pin 107*a*. The outlet hole O is an opening through which cooling oil having passed through a cooling flow passage (not shown) of the piston rod 6 is discharged. In addition, the crosshead pin 107*a* is provided with the supply flow passage R4 that connects the hydraulic chamber R3 and the plunger pump 8*c* to be described later to each other, and the relief flow passage R5 that connects the hydraulic chamber R3 and the relief valve 8*f* to be described later to each other.

The guide shoe 7*b* supports the crosshead pin 107*a*. The guide shoe 7*b* moves, on a guide rail (not shown), in the stroke direction of the piston 4 in association with the crosshead pin 107*a*. The guide shoe 7*b* moves along the guide rail, so that the crosshead pin 107*a* is regulated with respect to movement other than movement in a linear direction parallel to the stroke direction of the piston 4. The lid member 107*c* is an annular member which is fixed to an upper portion of the crosshead pin 107*a* and into which the end portion of the piston rod 6 is inserted.

The fixing bolt 107*d* includes a head portion 107*d*1 and a shaft portion 107*d*2. The shaft portion 107*d*2 is inserted into a bolt hole provided in the lid member 107*c*, so that the fixing bolt 107*d* fixes the lid member 107*c* to the crosshead pin 107*a*. In addition, the head portion 107*d*1 of the fixing bolt 107*d* is separated from the lid member 107*c*, and the coil spring 107*e* (absorption member) is inserted between the head portion 107*d*1 and the lid member 107*c*. The coil spring 107*e* is fixed on a surface (upper surface), which does not abut the crosshead pin 107*a*, of the lid member 107*c* by the head portion 107*d*1 of the fixing bolt 107*d*, and biases the lid member 107*c* toward the crosshead pin 107*a* (downward). The crosshead 107 transmits a linear motion of the piston 4 to the connecting rod 9.

As shown in FIG. 4, the hydraulic portion 8 includes the supply pump 8*a*, the oscillating pipe 8*b*, the plunger pump 8*c*, the first check valve 8*d* and the second check valve 8*e* included in the plunger pump 8*c*, and the relief valve 8*f*. In addition, the piston rod 6, the crosshead 107, the hydraulic portion 8, and the controller 300 function as a variable compression device in the present embodiment.

The supply pump 8*a* pressurizes hydraulic oil supplied from the hydraulic oil tank (not shown) and supplies the pressurized hydraulic oil to the plunger pump 8*c* on the basis of an instruction received from the controller 300. The supply pump 8*a* is driven using power of a generator of the ship and can be operated before a liquid fuel is supplied to the combustion chamber R1. The oscillating pipe 8*b* connects the supply pump 8*a* and the plunger pump 8*c* of each cylinder to each other. The oscillating pipe 8*b* is slidable between the plunger pump 8*c* moving in association with the crosshead pin 107*a* and the fixed supply pump 8*a*.

The plunger pump 8*c* is fixed to the crosshead pin 107*a*. The plunger pump 8*c* includes a rod-shaped plunger 8*c*1, a tubular cylinder 8*c*2 that slidably accommodates the plunger 8*c*1, and a plunger driving unit 8*c*3. In the plunger pump 8*c*, the plunger 8*c*1 slides inside the cylinder 8*c*2 by a driving unit (not shown) connected to the plunger 8*c*1, thereby pressurizing hydraulic oil and supplying the pressurized hydraulic oil to the hydraulic chamber R3. In addition, the first check valve 8*d* is provided in an opening, on an ejection side of hydraulic oil, which is provided in an end portion of the cylinder 8*c*2, and the second check valve 8*e* is provided in an opening, on an injection side of hydraulic oil, which is provided on the side circumferential surface of the cylinder 8*c*2. The plunger driving unit 8*c*3 is connected to the plunger 8*c*1 and reciprocates the plunger 8*c*1 on the basis of an instruction received from the controller 300.

The first check valve 8*d* is configured to be closed by a valve body being biased toward the inner side of the cylinder 8*c*2 and prevents hydraulic oil supplied to the hydraulic chamber R3 from flowing backward to the cylinder 8*c*2. In addition, the first check valve 8*d* is opened by the valve body being pressed by hydraulic oil when the pressure of the hydraulic oil in the cylinder 8*c*2 becomes equal to or higher than a biasing force (valve-opening pressure) of a biasing member of the first check valve 8*d*. The second check valve 8*e* is biased toward the outer side of the cylinder 8*c*2 and prevents the hydraulic oil supplied to the cylinder 8*c*2 from flowing backward to the supply pump 8*a*. In addition, the second check valve 8*e* is opened by the valve body being pressed by hydraulic oil when the pressure of the hydraulic oil supplied from the supply pump 8*a* becomes equal to or higher than a biasing force (valve-opening pressure) of a biasing member of the second check valve 8*e*. Meanwhile, the valve-opening pressure of the first check valve 8*d* is higher than the valve-opening pressure of the second check valve 8*e*, and the first check valve 8*d* is not opened by the pressure of hydraulic oil supplied from the supply pump 8*a* in a normal operation state where the system is operated at a preset compression ratio.

The relief valve 8*f* is provided in the crosshead pin 107*a*. The relief valve 8*f* includes the main body 8*f*1 and the relief valve driving unit 8*f*2. The main body 8*f*1 is a valve which is connected to the hydraulic chamber R3 and the hydraulic oil tank (not shown). The relief valve driving unit 8*f*2 is connected to a valve body of the main body 8*f*1 and opens and closes the main body 8*f*1 on the basis of an instruction received from the controller 300. The relief valve 8*f* is opened by the relief valve driving unit 8*f*2, so that hydraulic oil stored in the hydraulic chamber R3 is returned to the hydraulic oil tank.

As shown in FIG. 1, the connecting rod 9 is an elongate member which is coupled to the crosshead pin 107*a* and coupled to the crank shaft 11. The connecting rod. 9 converts a linear motion of the piston 4 which is transmitted to the crosshead pin 107*a* into a rotational motion. The crank angle sensor 10 is a sensor for measuring a crank angle of the crank shaft 11, and transmits a crank pulse signal for calculating a crank angle to the controller 300.

The crank shaft 11, which is an elongate member which is connected to the connecting rod 9 provided in the cylinder, is rotated by rotational motions transmitted to the respective connecting rods 9 to transmit power to, for example, a screw or the like. The scavenging reservoir 12 is provided between the cylinder jacket 3*c* and the supercharger 200, and air pressurized by the supercharger 200 flows into the scavenging reservoir 12. In addition, the air cooler 14 is provided inside the scavenging reservoir 12. The exhaust reservoir 13 is a tubular member which is connected to the exhaust port H of each cylinder and connected to the supercharger 200. A gas discharged from the exhaust port H is temporarily stored in the exhaust reservoir 13 and is then supplied to the supercharger 200 in a state where pulsation is suppressed. The air cooler 14 cools air inside the scavenging reservoir 12.

The supercharger 200 pressurizes air suctioned from the outside of the engine using a driven blower (not shown) or the like, and supplies the pressurized air to the scavenging reservoir 12 by a turbine which is rotated by a gas discharged from the exhaust port H.

The controller 300 is a computer that controls the amount of fuel to be supplied, and the like on the basis of an operation of an operator of the ship, or the like. In addition, the controller 300 changes a compression ratio in the combustion chamber R1 by controlling hydraulic portion 8. Specifically, the controller 300 acquires positional information of the piston rod 6 on the basis of a signal received from the cylinder internal pressure sensor, and controls the plunger pump 8*c*, the supply pump 8*a*, and the relief valve 8*f* to adjust the amount of hydraulic oil in the hydraulic chamber R3, thereby changing the position of the piston rod 6 to change a compression ratio. In addition, the controller 300 changes an oil injection amount and an oil injection timing on the basis of the positional information of the piston rod 6.

The engine system 100 causes the piston 4 to slide within the cylinder liner 3*a* to rotate the crank shaft 11 by igniting and exploding fuel injected into the combustion chamber R1 front the fuel injection valve (not shown). In detail, the gaseous fuel supplied to the combustion chamber R1 is mixed with air flowing from the scavenging ports S and is then compressed due to the movement of the piston 4 in the direction of the top dead center, which results in a rise in temperature. At this time, combustion is performed by spraying a small amount of a liquid fuel as an ignition source. Further, in the case of a liquid fuel, combustion is performed by the liquid fuel being injected to air compressed in the combustion chamber R1.

In addition, the fuel in the combustion chamber R1 is rapidly expanded due to combustion, and a pressure directed in a direction of a bottom dead center is applied to the piston 4. Thereby, the piston 4 moves in the direction of the bottom dead center, the piston rod 6 is moved in association with the piston 4, and the crank shaft 11 is rotated via the connecting rod 9. Further, the piston 4 is moved to the bottom dead center, so that pressurized air flows into the combustion chamber R1 from the scavenging ports S. The exhaust port H is opened due to the exhaust valve unit 5 being driven, and an exhaust gas in the combustion chamber R1 is pushed out to the exhaust reservoir 13 by pressurized air.

In a case where a compression ratio is increased, the controller 300 drives the supply pump 8*a* to supply hydraulic oil to the plunger pump 8*c*. In addition, the controller 300 drives the plunger pump 8*c* to pressurize hydraulic oil to a pressure capable of lifting the piston rod 6, and supplies the pressurized hydraulic oil to the hydraulic chamber R3. The end portion of the piston rod 6 is lifted by the pressure of the hydraulic oil in the hydraulic chamber R3, and accordingly, the position of the top dead center of the piston 4 is moved upward (to the exhaust port H side).

In a case where a compression ratio is decreased, the controller 300 drives the relief valve 8*f* to make the hydraulic chamber R3 and the hydraulic oil tank (not shown) communicate with each other. The load of the piston rod 6 is applied to the hydraulic oil in the hydraulic chamber R3, and the hydraulic oil in the hydraulic chamber R3 is pushed out to the hydraulic oil tank through the relief valve 8*f*. Thereby, the hydraulic oil of the hydraulic chamber R3 is reduced, and the piston rod 6 is moved downward (to the crank shaft 11 side), thereby moving the position of the top dead center of the piston 4 downward.

When the piston rod 6 is moved in a direction of a high compression ratio, the piston rod 6 abuts the lid member 107*c*. At this time, the lid member 107*c* is slightly raised from the crosshead pin 107*a*, but is returned to the crosshead pin 107*a* side due to a biasing force of the coil spring 107*e*. Thereby, the coil spring 107*e* absorbs collision energy received by the lid member 107*c* from the piston rod 6, so that it is possible to prevent a large force from being applied to the lid member 107*c*.

Further, in the present embodiment, the piston rod 6 does not abut the coil spring 107e, and thus the movement of the piston rod 6 is not hindered by the coil spring 107e when the piston rod 6 is moved in a direction of a high compression ratio.

Third Embodiment

Figure 5:
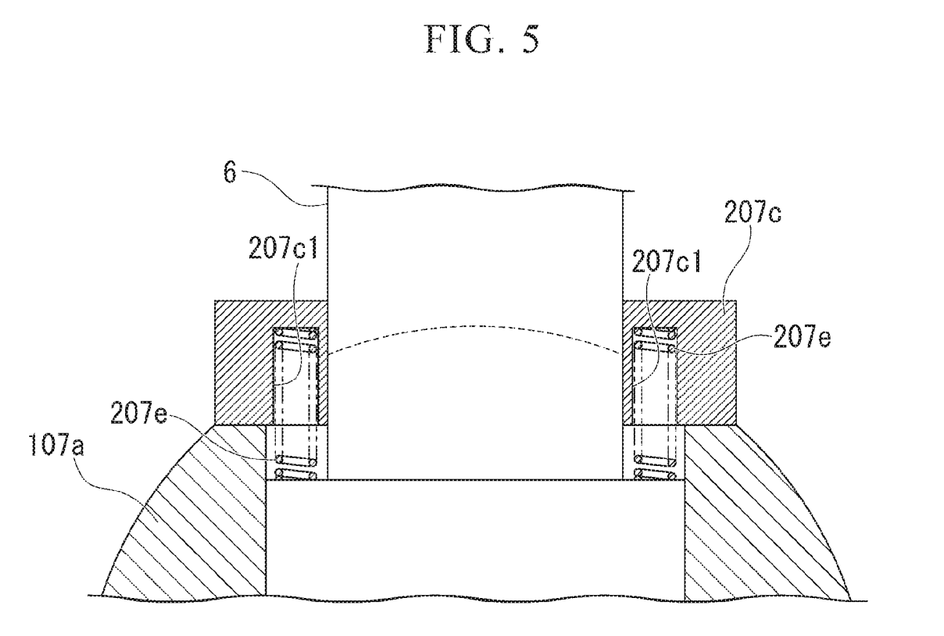
FIG. 5 is a schematic cross-sectional view showing a portion of an engine system according to a third embodiment of the disclosure.

Subsequently, a modification example of the second embodiment will be described as a third embodiment with reference to FIG. 5. Meanwhile, the same components as those in the second embodiment will be denoted by the same reference numerals and signs, and description thereof will be omitted.

In an engine 1 of the present embodiment, the coil spring 107e inserted into the fixing bolt 107d is not provided, and a plurality of coil springs 207e are fitted to a plurality of concave portions 207c1 provided at equal intervals on a surface (lower surface), which abuts the flange (large diameter portion) of the piston rod 6, of a lid member 207c. That is, the coil spring 207e is provided between the flange (large diameter portion) of the piston rod 6 and the lid member 207c. Meanwhile, the lid member 207c and the flange (large diameter portion) do not abut each other in a state where the coil spring 207e is completely compressed.

According to the present embodiment, when the piston rod 6 is moved in a direction of a high compression ratio, the piston rod 6 abuts the coil spring 207e before abutting the lid member 207c, and the coil spring 207e is elastically deformed, so that collision energy is absorbed and a moving speed of the piston rod 6 is reduced. Thereby, it is possible to prevent the piston rod 6 from violently colliding with the lid member 207c.

Further, in the present embodiment, the piston rod 6 comes into contact with the coil spring 207e before coming into contact with the lid member 207c, and thus it is possible to more effectively prevent an impact on the lid member 207c.

Further, in the present embodiment, the concave portion 207c1 is formed at a position in the lid member 207c where the coil spring 207e is installed, and the coil spring 207e is fitted and fixed to the concave portion 207c1. Thereby, the coil spring 207e does not deviate from a predetermined position, and the coil spring 207e and the piston rod 6 abut each other at a fixed position at all times, so that it is possible to effectively absorb collision energy.

While preferred embodiments of the disclosure have been described with reference to the drawings, the disclosure is not limited to the embodiment. Shapes, combinations, and the like of the constituent members described in the above-described embodiments are exemplary, and various modifications can be made on the basis of a request for design, and the like without departing from the scope of the disclosure.

In the first embodiment, the throttle valve device 15b is used as a flow rate regulation unit, but the disclosure is not limited thereto. For example, a throttle valve 16 shown in FIG. 3 may be used as a flow rate regulation unit. The throttle valve 16 includes a flow path member 16a, a valve body 16b installed in the flow path member 16a, and a biasing spring 16c that biases the valve body 16b in a valve opening direction. The flow path member 16a is fixed to the lid member 7c and forms a portion of the discharge flow path R8. The valve body 16b is provided inside the flow path member 16a so as to be movable in the vertical direction. When the piston rod 6 is moved in a direction coming close to the lid member 7c due to an inertial force, the valve body 16b is moved in a valve closing direction. Similar to the above-described embodiment, by using the throttle valve 16, it is possible to hold hydraulic oil in the upper hydraulic chamber R6 by closing the flow path member 16a when the piston rod 6 is moved in a direction coming close to the lid member 7c and to prevent collision between the piston rod 6 and the lid member 7c.

Further, in the first embodiment, the throttle valve device 15b is used, but a position detection sensor for detecting the position of the piston rod 6 may be provided, an electromagnetic valve may be provided in the discharge flow path R8, and opening and closing of the electromagnetic valve may be switched through electronic control on the basis of the position of the piston rod 6.

Further, in the first embodiment, a portion of hydraulic oil supplied to the hydraulic chamber R3 is supplied to the upper hydraulic chamber R6. However, the disclosure is not limited thereto, and hydraulic oil may be supplied to the upper hydraulic chamber R6 using another system.

In the second and third embodiments, the coil springs 107e and 207e are provided as an absorption member, but the disclosure is not limited thereto. For example, rubber or the like may be provided as an absorption member instead of the coil springs 107e and 207e.

In the second embodiment, the coil spring 107e is disposed between the head portion of the fixing bolt 107d and the lid member 107c, but the disclosure is not limited thereto. The coil spring 107e may be provided between the lid member 107c and a spring fixing member provided separately from the fixing bolt 107d.

In addition, the coil spring 107e may be provided on a surface, which abuts the lid member 107c, of the flange (large diameter portion) of the piston rod 6, instead of being provided in the lid member 107c, and the coil spring 207e may be provided on a surface, which abuts the lid member 207c, of the flange (large diameter portion) of the piston rod 6, instead of being provided in the lid member 207c.

Further, in the second and third embodiments, the coil springs 107e and 207e are directly fixed to the lid members 107c and 207c, respectively, through fitting or the fixing bolts 107d, but the disclosure is not limited thereto. The coil springs 107e and 207e may be indirectly fixed to the lid members 107c and 207c or the piston rod 6 through another member such as a washer.

In addition, the coil spring 107e (absorption member) described in the second embodiment may be combined with engine system 100 of the first embodiment. In this case, for example, the supply flow path R7, the discharge flow path R8, and the upper hydraulic chamber hydraulic mechanism 15 may be disposed at different positions from the fixing bolts 107d and the coil springs 107e in a circumferential direction of the lid member 7c. In addition, the supply flow path R7 and the discharge flow path R8 may be formed to communicate with the outside from an inner wall of the crosshead pin 7a.

In addition, the coil springs 207e (absorption member) described in the third embodiment may be combined with the engine system 100 of the first embodiment.

The disclosure can be applied to a variable compression device and an engine system.

What is claimed is:

1. A variable compression device that is configured to change a compression ratio in a combustion chamber of an engine, the variable compression device comprising:
   a piston rod;

a first fluid chamber which is configured to move the piston rod in a direction in which a compression ratio is increased by supplying a pressurized working fluid thereto;

a regulation member which is configured to regulate movement of the piston rod in a direction in which a compression ratio is increased;

a second fluid chamber which is provided between the piston rod and the regulation member and is configured to store the working fluid;

a supply flow path which is configured to guide the working fluid supplied to the second fluid chamber;

a discharge flow path which is configured to guide the working fluid discharged from the second fluid chamber, a portion of the discharge flow path being formed in the regulation member; and a flow rate regulation unit which is provided in the discharge flow path and is configured to regulate a flow of the working fluid when the piston rod approaches the regulation member.

2. The variable compression device according to claim 1, wherein the flow rate regulation unit includes a weight member which is movable together with the piston rod, and a valve which is moved in a valve closing direction by movement of the weight member.

3. The variable compression device according to claim 2, wherein the flow rate regulation unit includes a biasing member that is configured to bias the weight member in a valve opening direction.

4. The variable compression device according to claim 1, wherein a portion of the working fluid supplied to the first fluid chamber is supplied to the second fluid chamber.

5. The variable compression device according to claim 1, further comprising:

a fluid chamber forming member which forms a portion of the first fluid chamber; and an absorption member which is fixed to the regulation member or the piston rod, and is configured to absorb collision energy between the regulation member and the piston rod by elastic deformation.

6. The variable compression device according to claim 5, further comprising:

a fixing member which is configured to fix the regulation member to the fluid chamber forming member, wherein the fixing member includes a shaft portion which is inserted into the regulation member and the fluid chamber forming member, and a head portion which is fixed to the shaft portion and is disposed separately from the regulation member, and the absorption member is provided between the regulation member and the head portion.

7. The variable compression device according to claim 5, wherein the absorption member is provided between the regulation member and the piston rod.

8. The variable compression device according to claim 7, wherein the regulation member includes a concave portion to which the absorption member is fitted.

9. An engine system comprising the variable compression device according to claim 1.

* * * * *